United States Patent
Nash et al.

(10) Patent No.: US 10,922,829 B2
(45) Date of Patent: Feb. 16, 2021

(54) ZERO ORDER LIGHT REMOVAL IN ACTIVE SENSING SYSTEMS

(71) Applicant: QUALCOMM Incorporated, San Diego, CA (US)

(72) Inventors: James Wilson Nash, San Diego, CA (US); Kalin Mitkov Atanassov, San Diego, CA (US); Shandon Campbell, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/408,198

(22) Filed: May 9, 2019

(65) Prior Publication Data

US 2019/0378286 A1 Dec. 12, 2019

Related U.S. Application Data

(60) Provisional application No. 62/681,376, filed on Jun. 6, 2018.

(51) Int. Cl.
*G06T 7/521* (2017.01)
*G06T 7/70* (2017.01)
*G06T 5/20* (2006.01)

(52) U.S. Cl.
CPC ............... *G06T 7/521* (2017.01); *G06T 5/20* (2013.01); *G06T 7/70* (2017.01); *G06T 2207/10052* (2013.01)

(58) Field of Classification Search
CPC .. G06T 7/521; G06T 7/70; G06T 5/20; G06T 2207/10052
See application file for complete search history.

(56) References Cited

U.S. PATENT DOCUMENTS

| | | | | |
|---|---|---|---|---|
| 8,558,873 | B2* | 10/2013 | McEldowney | G01B 11/2513 348/46 |
| 9,948,920 | B2 | 4/2018 | Nash et al. | |
| 2010/0322481 | A1* | 12/2010 | Katano | G02B 27/4233 382/106 |
| 2013/0169959 | A1* | 7/2013 | Guenther | G01J 3/027 356/301 |
| 2014/0380115 | A1* | 12/2014 | Bar-On | H04B 10/80 714/758 |
| 2015/0138527 | A1* | 5/2015 | Hiramto | G01B 11/22 356/4.01 |
| 2018/0033146 | A1* | 2/2018 | Bleyer | G01B 11/2513 |
| 2018/0084240 | A1* | 3/2018 | Campbell | H04N 5/2353 |
| 2018/0173027 | A1* | 6/2018 | Morse | G02F 1/292 |

* cited by examiner

*Primary Examiner* — John B Strege
(74) *Attorney, Agent, or Firm* — QUALCOMM Incorporated

(57) ABSTRACT

A device for image processing includes an optical receiver configured to receive a reflection of a coded pattern from an object to generate an image, and processing circuitry. The processing circuitry is configured to determine an estimated position of zero order light in the image, determine a spatial region of the coded pattern that corresponds to a position of the zero order light in the coded pattern, map the spatial region to the estimated position of the zero order light in the image to generate a corrected image, and generate a depth map for the coded pattern based on the corrected image.

30 Claims, 15 Drawing Sheets

ZERO ORDER LIGHT REMOVAL IN ACTIVE SENSING SYSTEMS

This application claims the benefit of U.S. Provisional Application No. 62/681,376, filed Jun. 6, 2018, which is hereby incorporated by reference in its entirety.

TECHNICAL FIELD

This disclosure relates to depth map generation and more particularly to depth map generation using an active depth sensing system.

BACKGROUND

Active depth sensing systems transmit and receive light patterns. The received light patterns may be used to generate a depth map for a scene. The farther away an object is from the transmitter and receiver, the closer the received light pattern projection is to its original position at the receiver(s), as the outgoing light pattern projection and reflected incoming light pattern projection are more parallel. Conversely, the closer an object is to the transmitter and receiver, the farther the received light pattern projection is from its original position at the receiver(s). Thus, the difference between a received and a transmitted light pattern position indicates the depth of an object in the scene. Active depth sensing system use these relative depths to generate a depth map, or a three dimensional representation of a scene.

SUMMARY

This disclosure describes example techniques of determining a depth map where a spatial region at a position of zero order light is mapped to a received image. For example, an optical transmitter transmits, towards an object, a coded pattern of light. In this example, an optical receiver receives a reflection from the object of the coded pattern. The received reflection may include zero order light which obscures one or more spatial regions at the position of the zero order light in the received image. In this example, processing circuitry maps the one or more spatial regions at the position of the zero order light using the coded pattern to generate the depth image.

In one example, the disclosure describes a method of image processing, the method comprising transmitting, with an optical transmitter, towards an object, a coded pattern of light, receiving, with an optical receiver, a reflection of the coded pattern from the object to generate an image, determining, with processing circuitry, an estimated position of zero order light in the image, determining, with the processing circuitry, a spatial region of the coded pattern that corresponds to a position of the zero order light in the coded pattern, mapping, with the processing circuitry, the spatial region to the estimated position of the zero order light in the image to generate a corrected image, and generating, with the processing circuitry, a depth map for the coded pattern based on the corrected image.

In one example, the disclosure describes a device for image processing, the device comprising an optical receiver configured to receive a reflection of a coded pattern from an object to generate an image, and processing circuitry. The processing circuitry is configured to determine an estimated position of zero order light in the image, determine a spatial region of the coded pattern that corresponds to a position of the zero order light in the coded pattern, map the spatial region to the estimated position of the zero order light in the image to generate a corrected image, and generate a depth map for the coded pattern based on the corrected image.

In one example, the disclosure describes a computer-readable storage medium including instructions stored thereon that when executed cause one or more processors of a device for image processing to cause an optical transmitter to transmit, towards an object, a coded pattern of light and cause an optical receiver to receive a reflection of the coded pattern from the object to generate an image. The instructions further cause processing circuitry to determine an estimated position of zero order light in the image, determine a spatial region of the coded pattern that corresponds to a position of the zero order light in the coded pattern, map the spatial region to the estimated position of the zero order light in the image to generate a corrected image, and generate a depth map for the coded pattern based on the corrected image.

In one example, the disclosure describes a device for image processing, the device comprising means for transmitting, towards an object, coded pattern of light, means for receiving a reflection of the coded pattern from the object to generate an image, means for determining an estimated position of zero order light in the image, the zero order light indicating undiffracted light output by the optical transmitter when transmitting the coded pattern, means for determining a spatial region of the coded pattern that corresponds to a position of the zero order light in the coded pattern, means for mapping the spatial region to the estimated position of the zero order light in the image to generate a corrected image, and means for generating a depth map for the coded pattern based on the corrected image.

The details of one or more examples are set forth in the accompanying drawings and the description below. Other features, objects, and advantages will be apparent from the description, drawings, and claims.

DETAILED DESCRIPTION

To generate images that a user perceives to encompass a three-dimensional space, a device may generate a depth map of the scene or object in the images to be rendered. One way to generate the depth map is in an active sensing system, also referred to as a verged active stereo system. In the coded pattern system, a transmitter device projects a coded pattern on a scene and a receiver device receives the coded pattern to obtain a depth map. For instance, the transmitter device transmits a coded pattern of light that includes the coded pattern on to the scene or object, and the receiver device receives a reflection of the coded pattern from the scene or object.

Then, based on a position of where a receiver received the coded pattern, the receiver device may determine an estimate of the distance of the scene or object from the receiver. Based on the determined distances, the receiver device generates a depth map. A processing circuit (which may be a programmable and/or fixed function processing circuit) may then use the generated depth map to generate graphical data for one or more images (e.g., a graphics processing circuit (GPU) uses the depth map to generate stereoscopic images).

A portion of the coded pattern, referred to herein as "zero order light," projected to the scene or object may be undiffracted. Such undiffracted, zero order light saturates a brightness level at the optical receiver, which obscures a coded pattern at a spatial region positioned at the zero order light. As such, processing circuitry may not decode the coded pattern at a spatial region where zero order light is received. Moreover, processing circuitry generating a depth map may generate inaccurate depth values at the position of the zero order light due to the lack of decodable information at a spatial region at the position of the received zero order light.

The techniques described in this disclosure provide a way to determine a spatial region of a coded pattern that corresponds to a position of the zero order light in the coded pattern. A coded pattern may include, for example, but not limited to, one or more codewords, a pseudo random pattern of dots, or other information. With the techniques described in this disclosure, processing circuitry may generate a depth map using the coded pattern that correctly specifies depth values at a position of the zero order light, which results in a more accurate depth map compared to systems that do not account zero order light.

Figure 1:
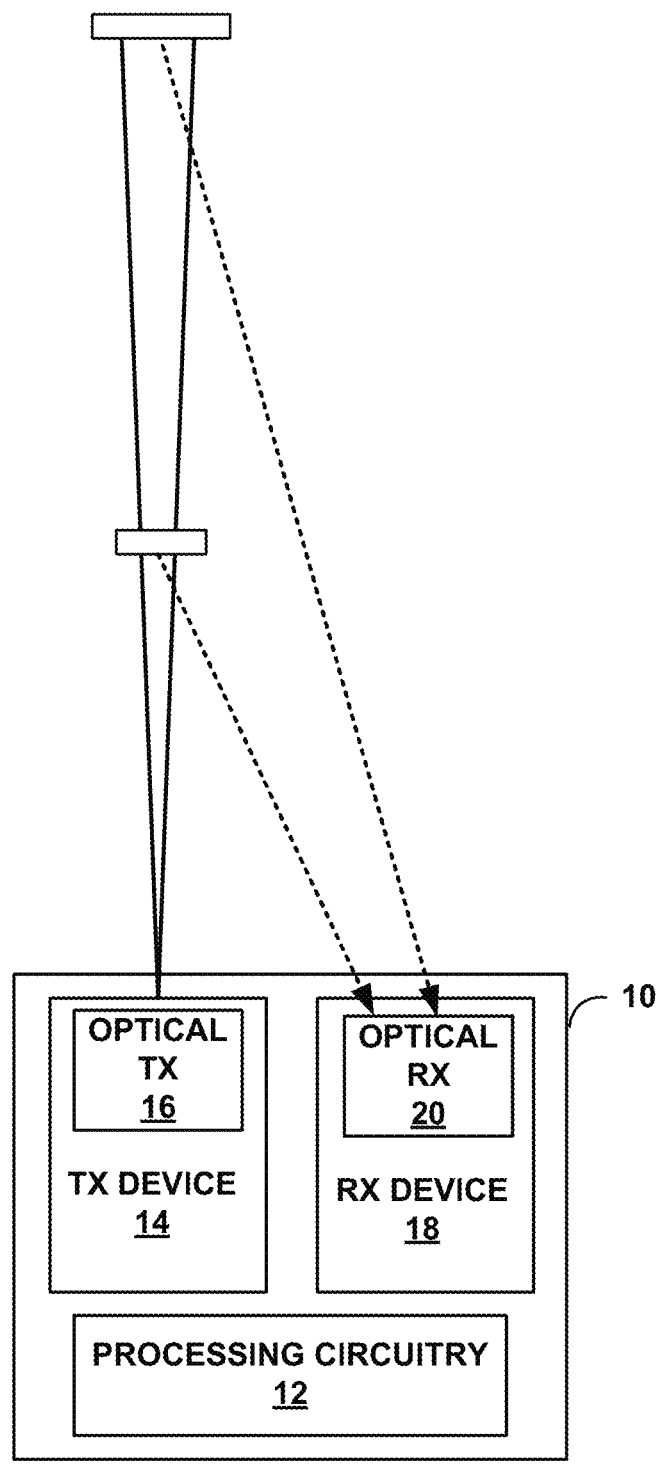
FIG. 1 is a conceptual diagram illustrating an example transmitter and receiver for generating a depth map.

FIG. 1 is a conceptual diagram illustrating an example transmitter and receiver for generating a depth map. FIG. 1 illustrates device 10 that includes processing circuitry 12, transmitter device 14 that is coupled to optical transmitter 16, and receiver device 18 that is coupled to optical receiver 20. Examples of device 10 include a desktop computer, a laptop computer, a tablet, a wireless communication device, a phone, a television, a camera, a display device, a digital media player, a video game console, a video gaming console, or a video streaming device.

Examples of transmitter device 14 and receiver device 18 include a microprocessor, an integrated circuit, a digital signal processor (DSP), a field programmable gate array (FPGA), or application specific integrated circuit (ASIC). In general, transmitter device 14 and receiver device 18 include processing circuitry 12 including programmable circuitry. Examples of optical transmitter 16 include a laser, and examples of optical receiver 20 include one or more optical sensors. In some examples, the laser outputs light (i.e., the depth map) in the infrared spectrum and the sensor receives the light (i.e., the depth map) in the infrared spectrum.

Although optical transmitter 16 is illustrated as part of transmitter device 14 and optical receiver 20 is illustrated as part of receiver device 18, the techniques described in this disclosure are not so limited. In some examples, transmitter device 14 and receiver device 18 may not include respective ones of optical transmitter 16 and optical receiver 20. In some examples, transmitter device 14 and receiver device 18 may be formed in the same integrated circuit along with other processing circuits forming a system on chip (SoC).

Transmitter device 14 may be configured to cause optical transmitter 16 to transmit a coded pattern of light. For instance, transmitter device 14 may include a local memory that stores a coded pattern used for depth map generation. In some examples, the coded pattern may be pseudo-random. In some examples, the coded pattern may be a predetermined pattern of codewords. A processing circuit of transmitter device 14 retrieves a coded pattern and causes optical transmitter 16 to transmit the coded pattern. The coded pattern reflects from objects and is received, through a lens or aperture, as a coded pattern reflection by optical receiver 20.

The reflections of the coded pattern are captured at different locations on optical receiver 20. For instance, assume that a first object is a first distance away from device 10, and a second object is a second distance away from device 10. In this example, the coded pattern that reflects off of the first object would appear at a first location on optical receiver 20 and the coded pattern that reflects off of the second object would appear at a second location on optical receiver 20. In this example, the disparity between the first location and the second location (e.g., the difference in the positions of the first location and the second location) indicates the relative depth of the first and second objects to one another and the positions of the first location and the second location indicate the absolute depth of the first and second objects.

In some examples, the further away an object is from optical transmitter 16 and optical receiver 20, the closer the received projected coded pattern is from its original position at optical receiver 20 (e.g., the outgoing projection and incoming projection are more parallel). Conversely, the closer an object is from optical transmitter 16 and optical receiver 20, the further the received projected coded pattern is from its original position at optical receiver 20. Thus, the difference between received and transmitted coded pattern may be used as an indicator of the depth of an object. In one example, such depth (e.g., relative depth) may provide a depth value for objects depicted by each pixel or grouped pixels (e.g., regions of two or more pixels) in an image.

The coded pattern may be considered as including a plurality of elements, where the elements (e.g., dots, codewords, etc.) in the coded pattern together form the coded pattern. Each element in the coded pattern is located at a transmitting location in the coded pattern transmitted by optical transmitter 16 at the time of transmission and then located at a receiving location by optical receiver 20. Receiver device 18 may include a local memory that stores a coded pattern used for depth map generation. A processing circuit of receiver device 18 compares the elements of the received coded pattern to those stored in the local memory to determine the depth map. The processing circuit within the receiver device 18 determines a disparity (e.g., difference) between the location of each spatial region in the transmitted a coded pattern of light and the received reflected a coded pattern of light and determines the depth map based on the disparity.

Figure 2:
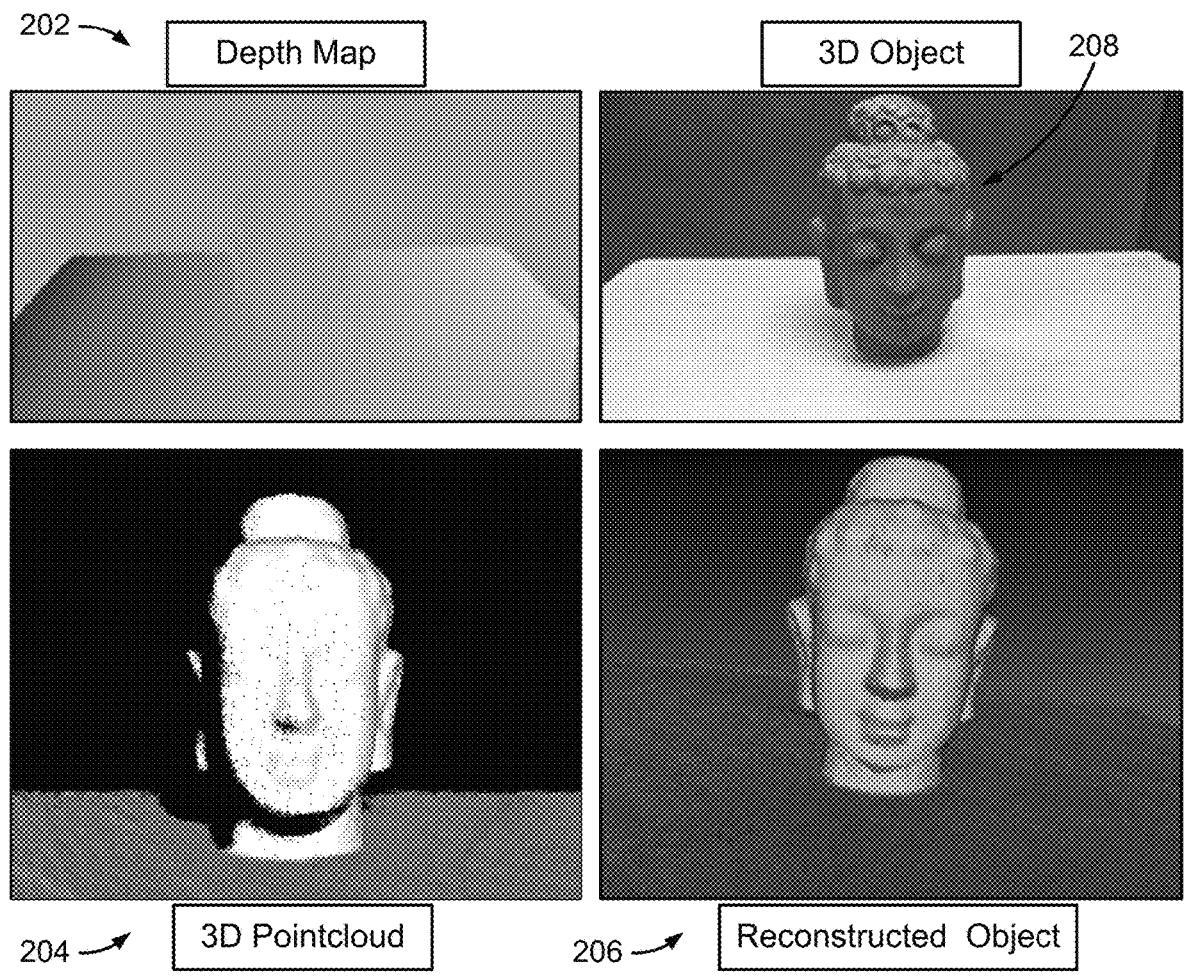
FIG. 2 is a conceptual diagram illustrating an example of a scanning application that uses a depth map.

FIG. 2 is conceptual diagram illustrating an example a of a scanning application that uses a depth map 202. For example, optical transmitter 16 transmits, towards 3D object 208, a coded pattern of light. In this example, optical receiver 20 receives a reflection of the coded pattern from 3D 208 object to generate an image and processing circuitry 12 generates depth map 202 for the coded pattern using the image according to techniques described herein for accounting for zero order light. In the example of FIG. 2, processing circuitry 12 uses depth map 202 to generate 3D point cloud 204, which may include a set of point clouds used, for example, to create 3D models. Processing circuitry 12 or other processing circuitry may use 3D point cloud 204 for a variety of applications, for example, 3D printing. For example, reconstructed image 206 illustrates a 3D reconstruction model of the 3D object that may be generated using 3D point cloud 204.

Figure 3:
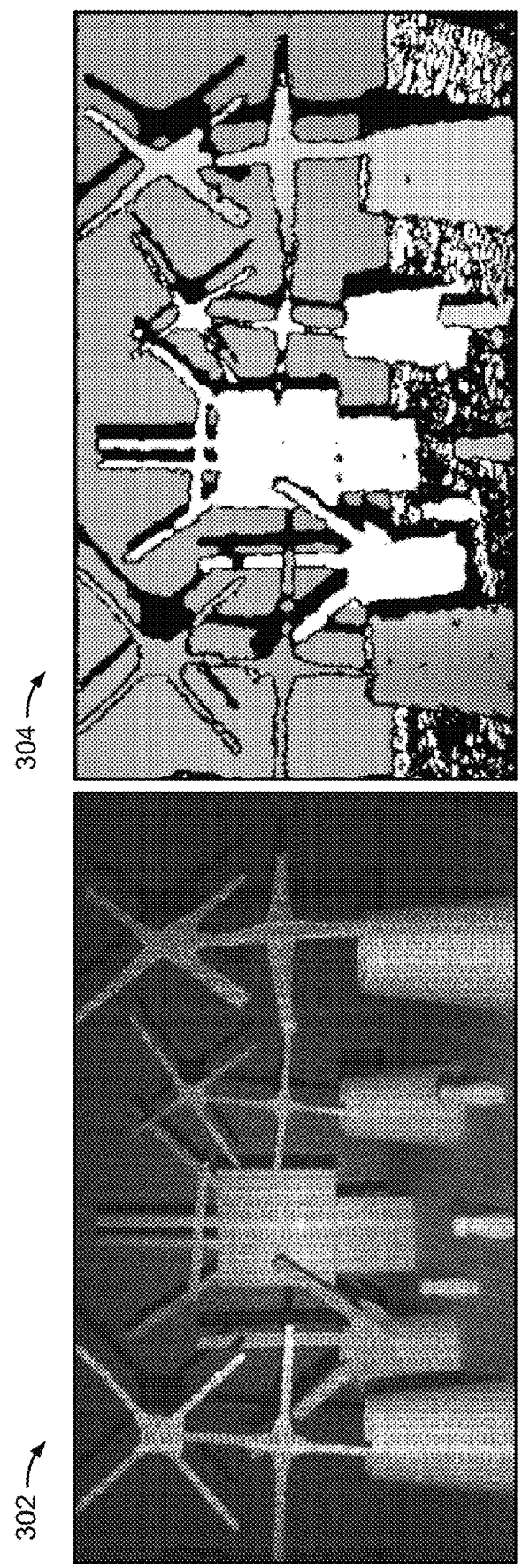
FIG. 3 is a conceptual diagram illustrating an example of depth mapping.

FIG. 3 is a conceptual diagram illustrating an example of depth mapping. In the example of FIG. 3, optical receiver 20 generates image 302. In this example, processing circuitry 12 generates depth map 304 using image 302 according to techniques described herein for accounting for zero order light. For example, optical receiver 20 may generate image 302 using a disparity between transmitting locations and receiving locations of the coded pattern.

Figure 4:
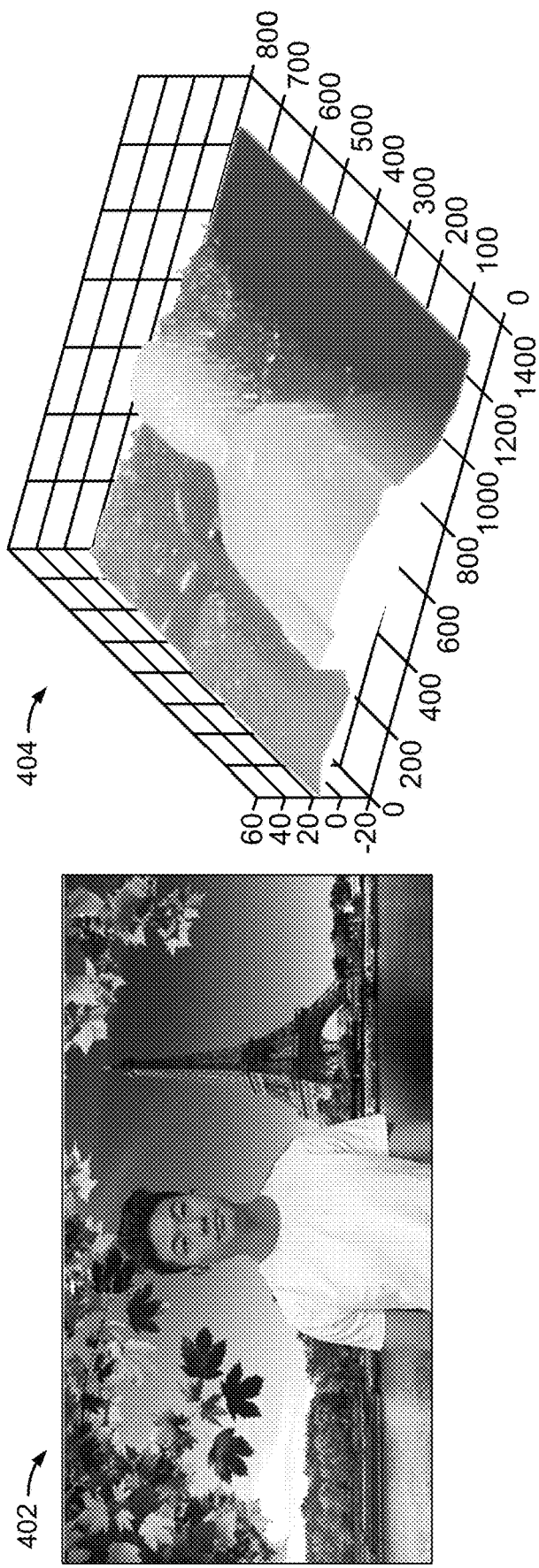
FIG. 4 is a conceptual diagram illustrating example applications for depth mapping.

FIG. 4 is a conceptual diagram illustrating example applications for depth mapping. In the example of FIG. 4, processing circuitry 12 may apply Bokeh and/or segmentation techniques to generate image 402. For instance, processing circuitry 12 may blur features of image 402 according to a depth map generated according to techniques described herein for accounting for zero order light. In another example, processing circuitry 12 may perform face liveness detection techniques. For instance, processing circuitry 12 may generate a 3D model 404 according to a depth map generated according to techniques described herein for accounting for zero order light. In this instance, processing circuitry 12 or other processing circuitry 12 may determine whether the 3D model 404 corresponds to a known object (e.g. face).

Figure 5:
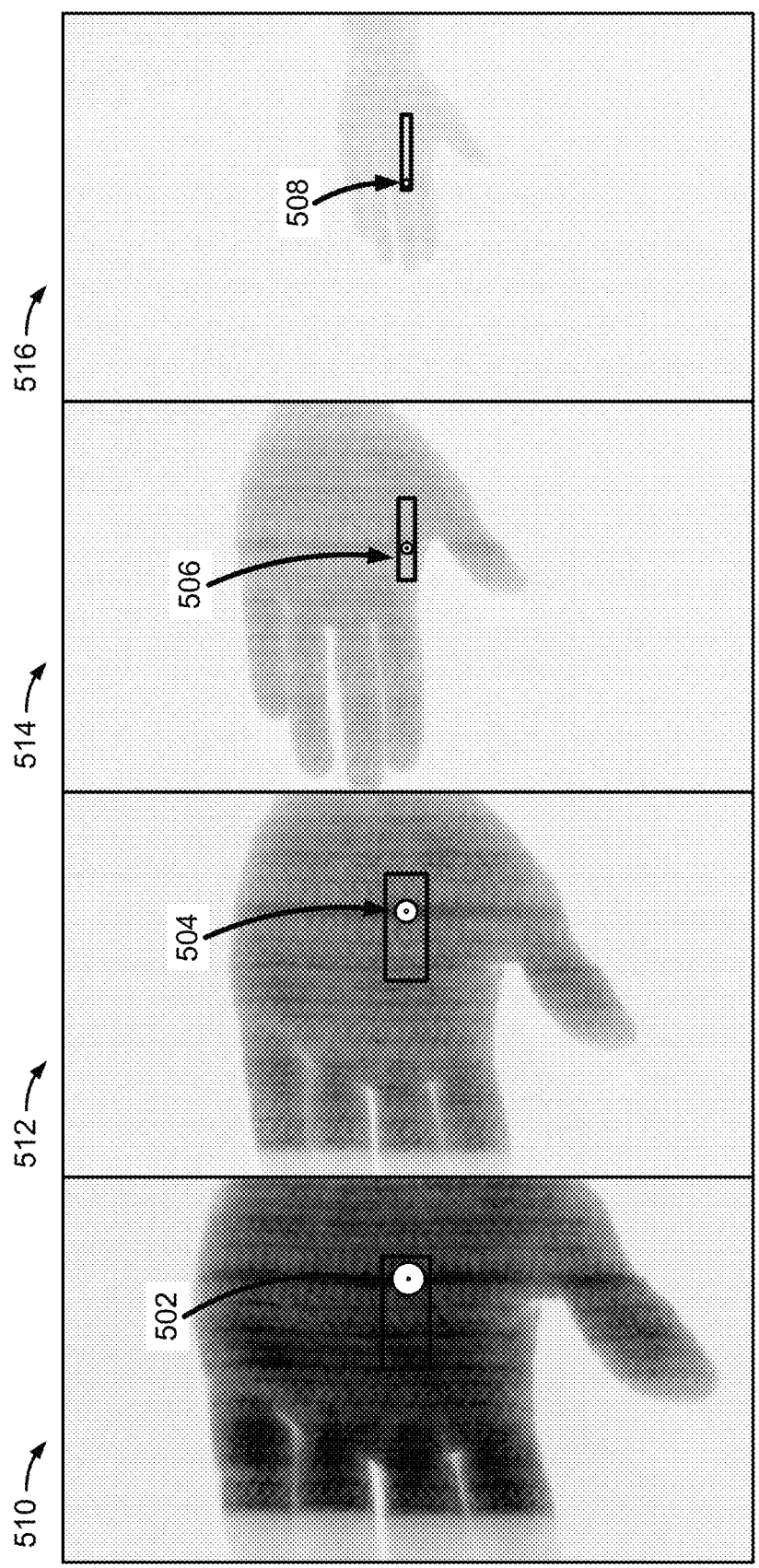
FIG. 5 is a conceptual diagram illustrating examples of zero order light at different scales.

FIG. 5 is a conceptual diagram illustrating examples of zero order light at different scales. The zero order light indicates undiffracted light output by the optical transmitter when transmitting the coded pattern. FIG. 5 illustrates first scale 510, second scale 512, third scale 514, and fourth scale 516. In the example of FIG. 5, a hand is relatively close to device 10 for first scale 510 and is moved further away from device 10 for second scale 512, even further away from device 10 for third scale 514, and even further from device 10 for fourth scale 516.

In FIG. 5, optical receiver 20 generates an image at first scale 510 with zero order light 502. Zero order light 502 may be the undiffracted light output by optical transmitter 16. In the example of FIG. 5, zero order light 502 may saturate optical receiver 20 such that optical receiver 20 may not decode a spatial region within a coded pattern positioned underneath zero order light 502. As shown, at first scale 510, zero order light 502 relatively large. As shown, at second scale 512, zero order light 504 is smaller than zero order light 502. Similarly, zero order light 506 is smaller than zero order light 504 and zero order light 508 is smaller than zero order light 506. Moreover, a position of the zero order light changes with distance. For example, a position of zero order light 502 in first scale 510 along the horizontal direction (e.g., left to right) is different from a position of zero order light 504 in second scale 512, a position of zero order light 506 in third scale 514, and a position of zero order light 508 in fourth scale 516.

Figure 6:
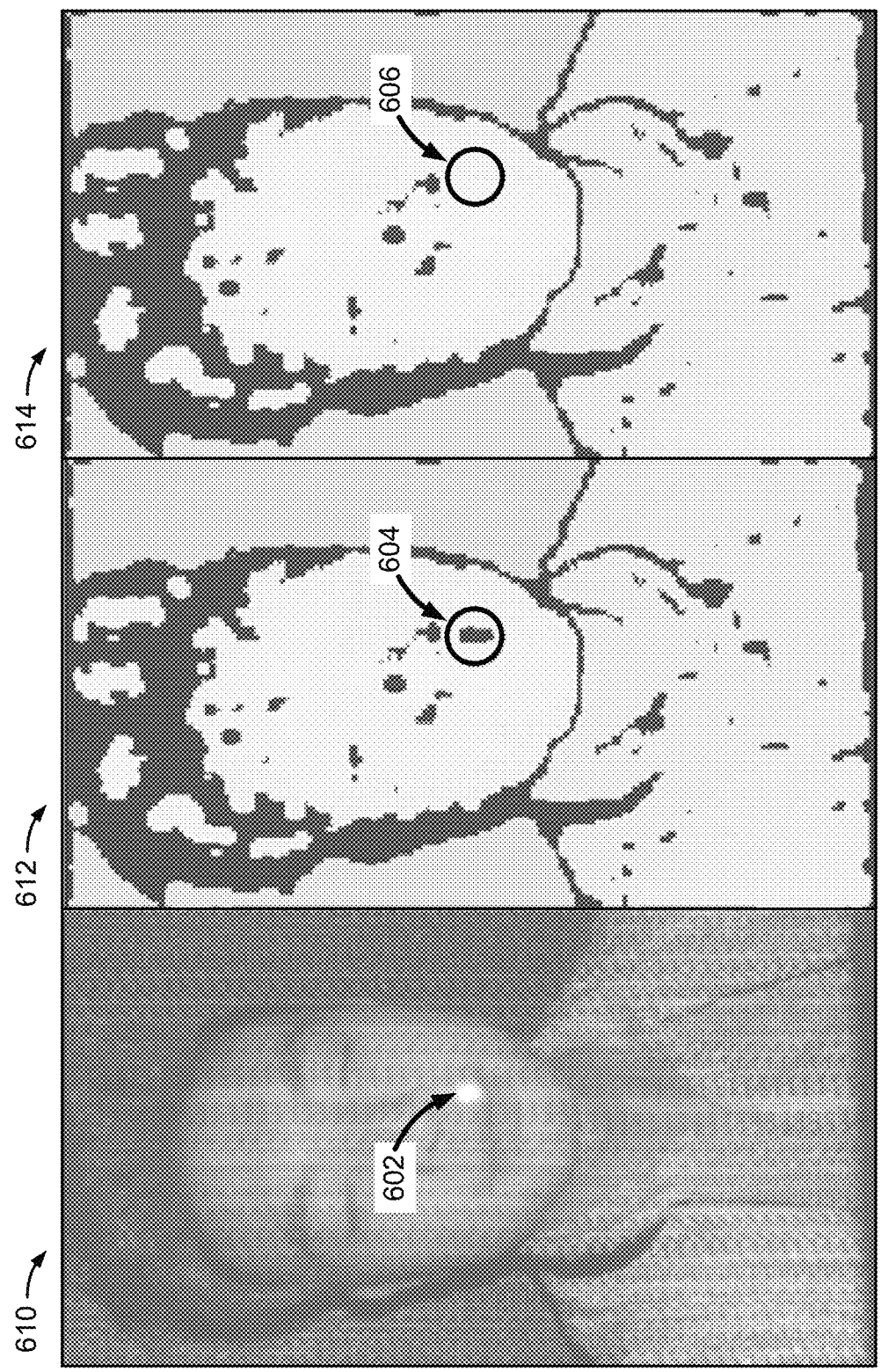
FIG. 6 is a conceptual diagram illustrating the effects of zero order light on depth mapping.

FIG. 6 is a conceptual diagram illustrating the effects of zero order light on depth mapping. In the example of FIG. 6, zero order light 602 of coded image 610 may saturate optical receiver 20 such that optical receiver 20 may not decode a spatial region within a coded pattern positioned underneath zero order light 602. As such, processing circuitry 12 may generate depth map 612 that includes inaccurate depth values 604, also referred to herein as a "hole." Inaccurate depth values 604 may obscure identifiable features in a depth map. This may interfere with certain application that use depth maps. For example, facial recognition application may be adversely affected. For example, in facial recognition applications, depth maps should not include holes on features such as noses, lips, or eyes. Using one or more techniques described herein for accounting for the zero order light 602 from the coded image 610, processing circuitry 12 may instead generate depth map 614 that includes accurate depth values 606. As shown, depth map 614 does not include holes, which makes depth map 614 more suitable for applications, such as, for example, but not limited to, facial recognition, 3D printing, or other applications.

Figure 7:
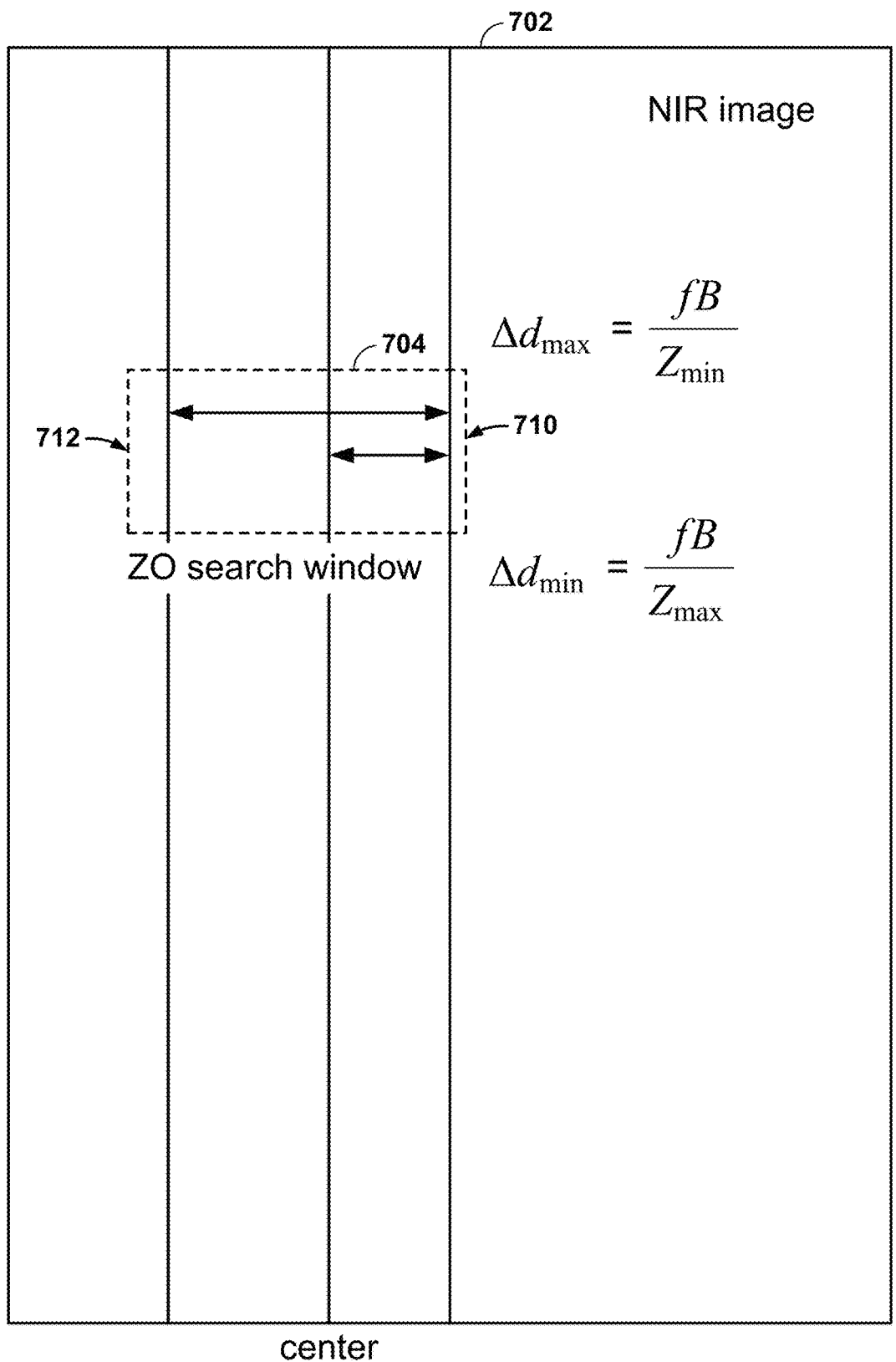
FIG. 7 is a conceptual diagram illustrating techniques for determining a probable location window for the zero order light.

FIG. 7 is a conceptual diagram illustrating techniques for determining a probable location window for the zero order light. In some examples, processing circuitry 12 may use the probable location window for the zero order light to provide a search range for determining the estimated position of the zero order light. However, in some examples, processing circuitry 12 may directly estimate estimated position of the zero order light without using a probable location window. As used herein, a probable location window may refer to a region of an image that comprises a zero order light for multiple distances between optical transmitter 16 and the object reflecting the coded pattern. In some examples, the probable location window may be indicative of a region of an image that is likely to comprise the zero order light.

Based on system parameters of device 10 (e.g., focal length of optical receiver 20, baseline, etc.), processing circuitry 12 may determine probable location window 704 of image 702. As shown, probable location window 704 of image 702 extends from inner horizontal edge 710 to outer horizontal edge 712. Processing circuitry 12 may determine probable location window 704 based on one or more of a minimum estimated distance between optical transmitter 16 and an object reflecting the coded pattern, a maximum estimated distance between optical transmitter 16 and the object reflecting the coded pattern, and a focal length of optical receiver 20. As used herein, an estimated distance may be, for example, a derived distance, a calculated distance, or another estimated distance.

For example, processing circuitry 12 may calculate an inner horizontal edge of the probable location window using the minimum estimated distance between the optical transmitter and the object reflecting the coded pattern. For instance, processing circuitry 12 may calculate $$\Delta d_{min} = \frac{fB}{Z\min},$$

wherein $\Delta d_{min}$ is inner horizontal edge 710 of probable location window 704, f is the focal length of optical receiver 20, and $Z_{min}$ is the minimum estimated distance between optical transmitter 16 and the object reflecting the coded pattern.

Processing circuitry 12 may calculate an outer horizontal edge of the probable location window using the maximum estimated distance between the optical transmitter and the object reflecting the coded pattern. For example, processing circuitry 12 may calculate $$\Delta d_{max} = \frac{fB}{Z\max},$$

wherein $\Delta d_{max}$ is outer horizontal edge 712 of probable location window 704 and $Z_{max}$ is the maximum estimated distance between optical transmitter 16 and the object reflecting the coded pattern.

Figure 8:
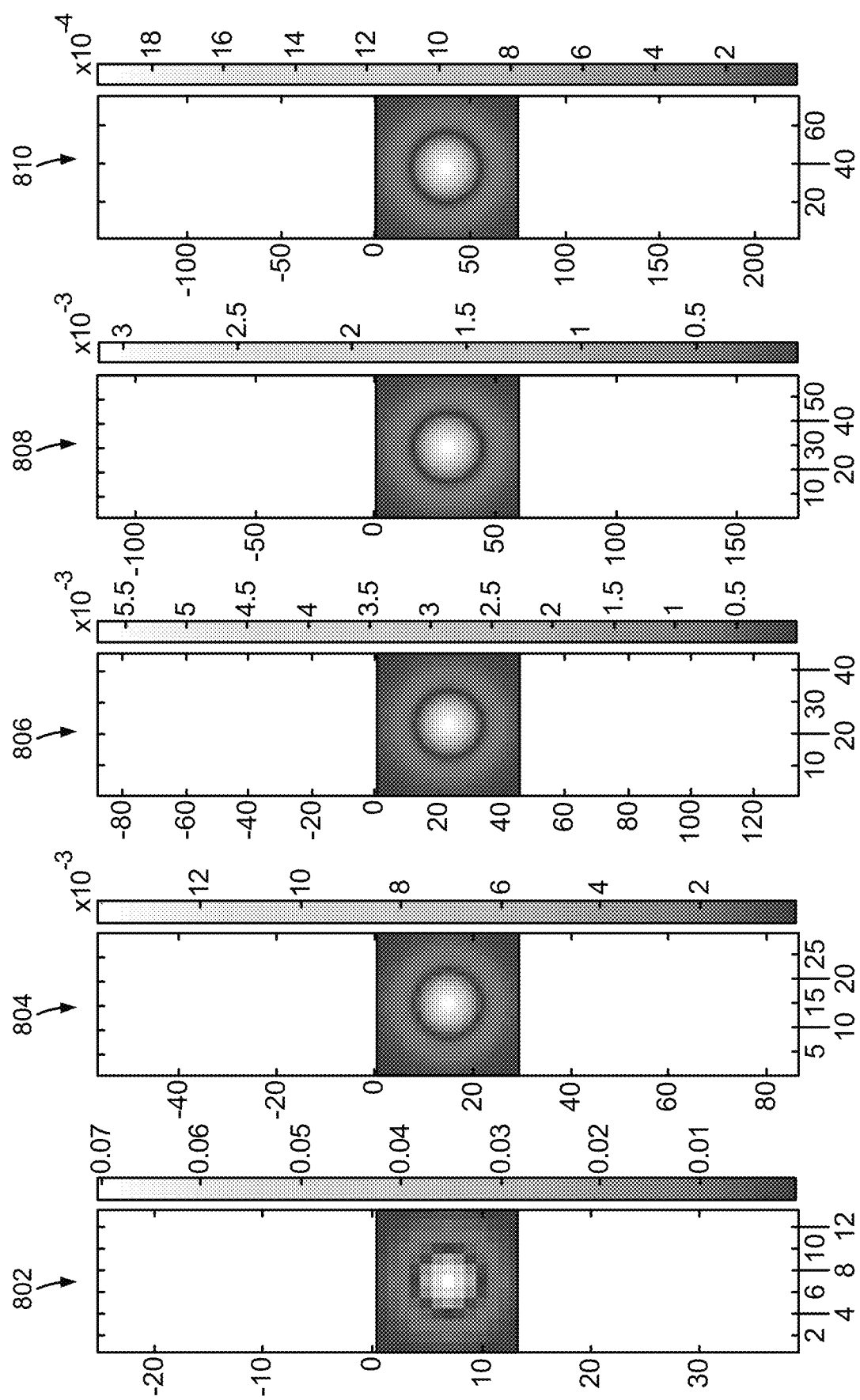
FIG. 8 is a conceptual diagram illustrating filters that are matched to a size of zero order light.

FIG. 8 is a conceptual diagram illustrating filters that are matched to a size of zero order light. The filters of FIG. 8 are shown for example purposes only and processing circuitry 12 may apply other filters to account for zero order light. In the example of FIG. 8, processing circuitry 12 may apply a filter within a probable location window of an image to estimate estimated position of the zero order. However, in some examples, processing circuitry 12 may apply a filter directly to an image to determine an estimated position of the zero order without using a probable location window.

In the example of FIG. 8, the multiscale blob detection may refer to intensity 802 of a first filter, intensity 804 of a second filter, intensity 806 of a third filter, intensity 808 of a fourth filter, and intensity 810 of a fifth filter. In the example of FIG. 8, each intensity of intensities 802-810 may represent a respective target size of zero order light, which is described further with FIG. 9. Processing circuitry 12 may apply filters of FIG. 8 to probable location window 704 of FIG. 7 to determine an estimated position of zero order light. As used herein, an estimated position may be, for example, a derived position, a calculated position, or another estimated position.

In the example of FIG. 8, processing circuitry 12 applies a "multiscale blob" detection algorithm to determine an estimated position of the zero order. For example, processing circuitry 12 may apply multiscale blob detection by applying multiple filters and determining the estimated position of the zero order using the filter that best matches the zero order light. However, in other examples, other techniques may be used to determine an estimated position of the zero order.

Figure 9:
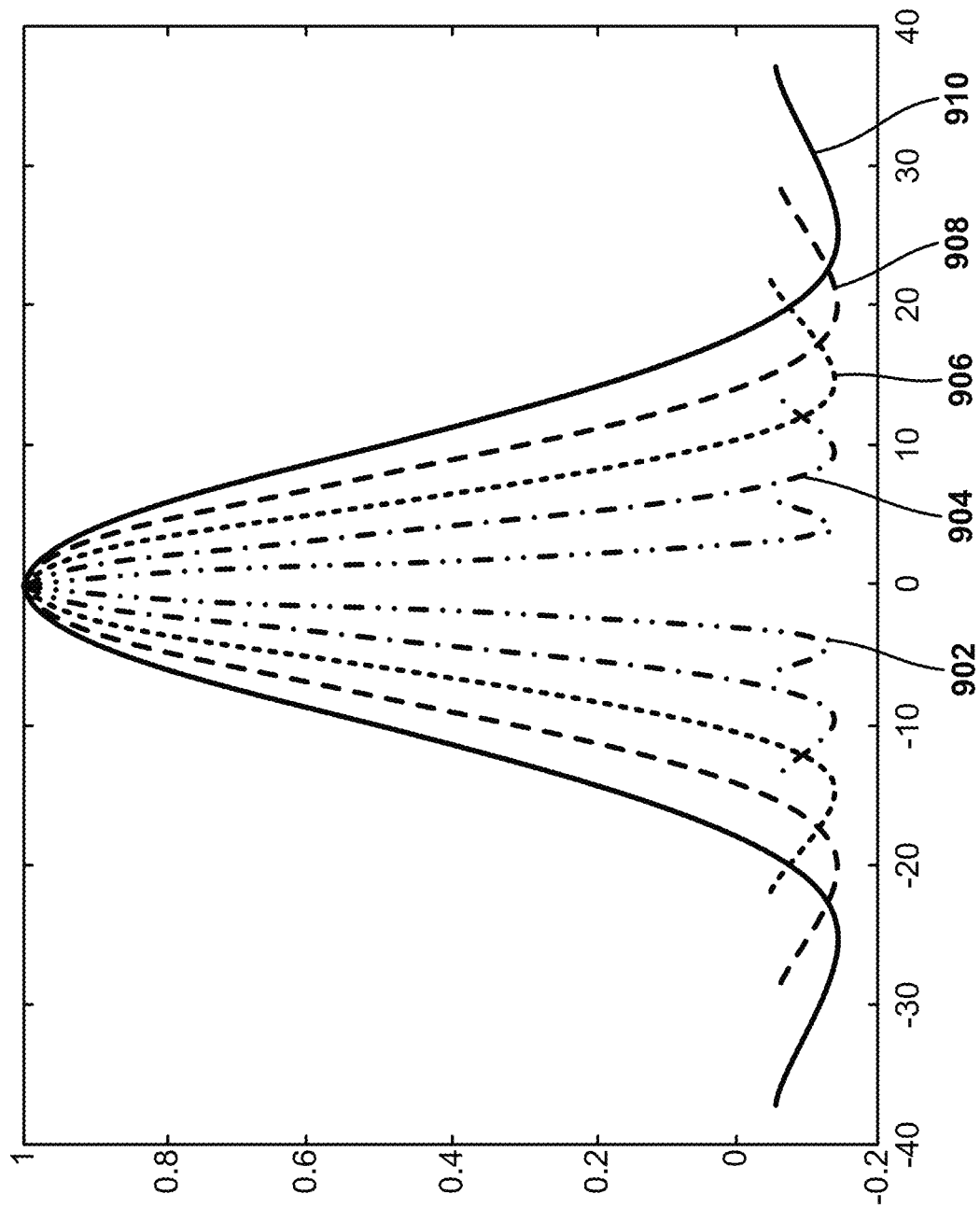
FIG. 9 is a chart illustrating the filters of FIG. 8.

FIG. 9 is a chart illustrating the filters of FIG. 8. As shown, intensity 902 corresponds to intensity 802 of FIG. 8, intensity 904 corresponds to intensity 804 of FIG. 8, intensity 906 corresponds to intensity 806 of FIG. 8, intensity 908 corresponds to intensity 808 of FIG. 8, and intensity 910 corresponds to intensity 810 of FIG. 8. The intensity of the filters shown in FIG. 9 is for example purposes only and processing circuitry 12 may apply other filters with other intensities to account for zero order light. In response to determining that a particular intensity of intensities 902-910 best matches zero order light in a received a coded pattern of light, processing circuitry 12 may select the filter corresponding to the particular intensity that best matches the zero order light.

Figure 10:
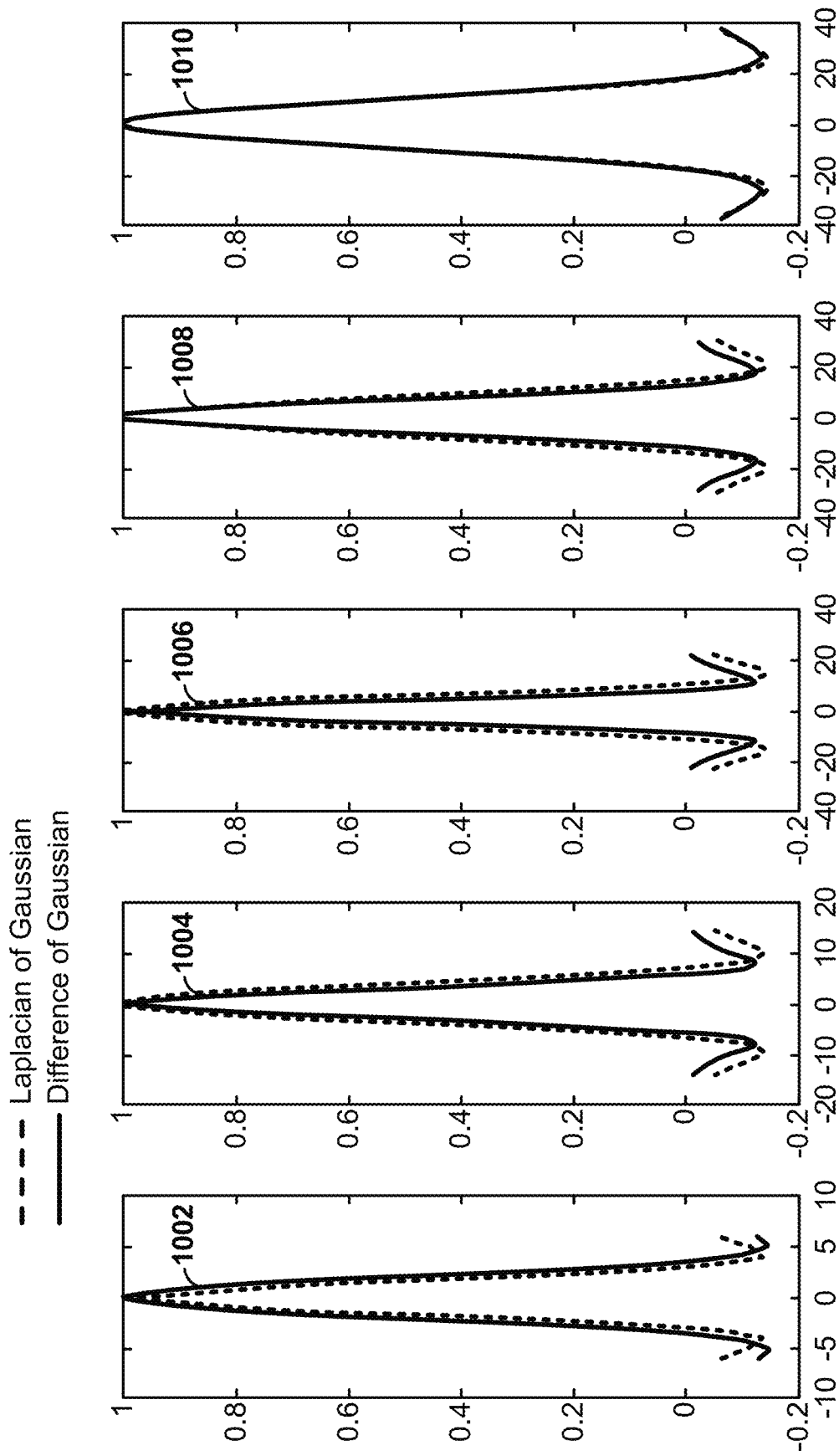
FIG. 10 is a conceptual diagram illustrating a difference of Gaussian and a Laplacian of Gaussian for the filters of FIG. 8.

FIG. 10 is a conceptual diagram illustrating a difference of Gaussian and a Laplacian of Gaussian for the filters of FIG. 8. As shown, Laplacian of Gaussian of the intensity 802 of FIG. 8 and difference of Gaussian 1002 (which overlaps Laplacian of Gaussian) corresponds to intensity 802 of FIG. 8, Laplacian of Gaussian and difference of Gaussian 1004 (which overlaps Laplacian of Gaussian) corresponds to intensity 804 of FIG. 8, Laplacian of Gaussian and difference of Gaussian 1006 (which overlaps Laplacian of Gaussian) corresponds to intensity 806 of FIG. 8, Laplacian of Gaussian and difference of Gaussian 1008 (which overlaps Laplacian of Gaussian) corresponds to intensity 808 of FIG. 8, and Laplacian of Gaussian and difference of Gaussian 1010 (which overlaps Laplacian of Gaussian) corresponds to intensity 810 of FIG. 8.

Because of the similarities in Laplacian of Gaussian and difference of Gaussian, processing circuitry 12 may select a filter using a difference of Gaussian, which may be simpler to calculate compared to difference of Laplacian. Again, while the example of FIG. 10 may apply multiscale blob detection using example filters, of FIG. 8 processing circuitry 12 may select a filter using a difference of Gaussian instead of a difference of Laplacian when applying other filter techniques and/or other filters.

In some examples, using a difference of Gaussian allows for a separable filter kernel and/or real-time detection. Processing circuitry 12 may convolve a set of filters represented by the difference of Gaussian 1002, difference of Gaussian 1004, difference of Gaussian 1006, difference of Gaussian 1008, and difference of Gaussian 1010 with the input image. Again, while the example of FIG. 10 may apply multiscale blob detection, processing circuitry 12 may apply a separable filter kernel and/or real-time detection using a difference of Gaussian instead of a difference of Laplacian when applying other filter techniques.

In this example, processing circuitry 12 may estimate a location and size of a zero order using the maximum response of the set of filters. In this manner, processing circuitry 12 may determine an estimated position of zero order light in a received image using a probable location window (e.g., probable location window 704 of FIG. 7) and filters (e.g., filters described in FIGS. 7-10 or other filters). While the example of FIG. 10 applies difference of Gaussian, in some examples, processing circuitry 12 may apply other techniques (e.g., Laplacian of Gaussian) to select a filter.

Figure 11:
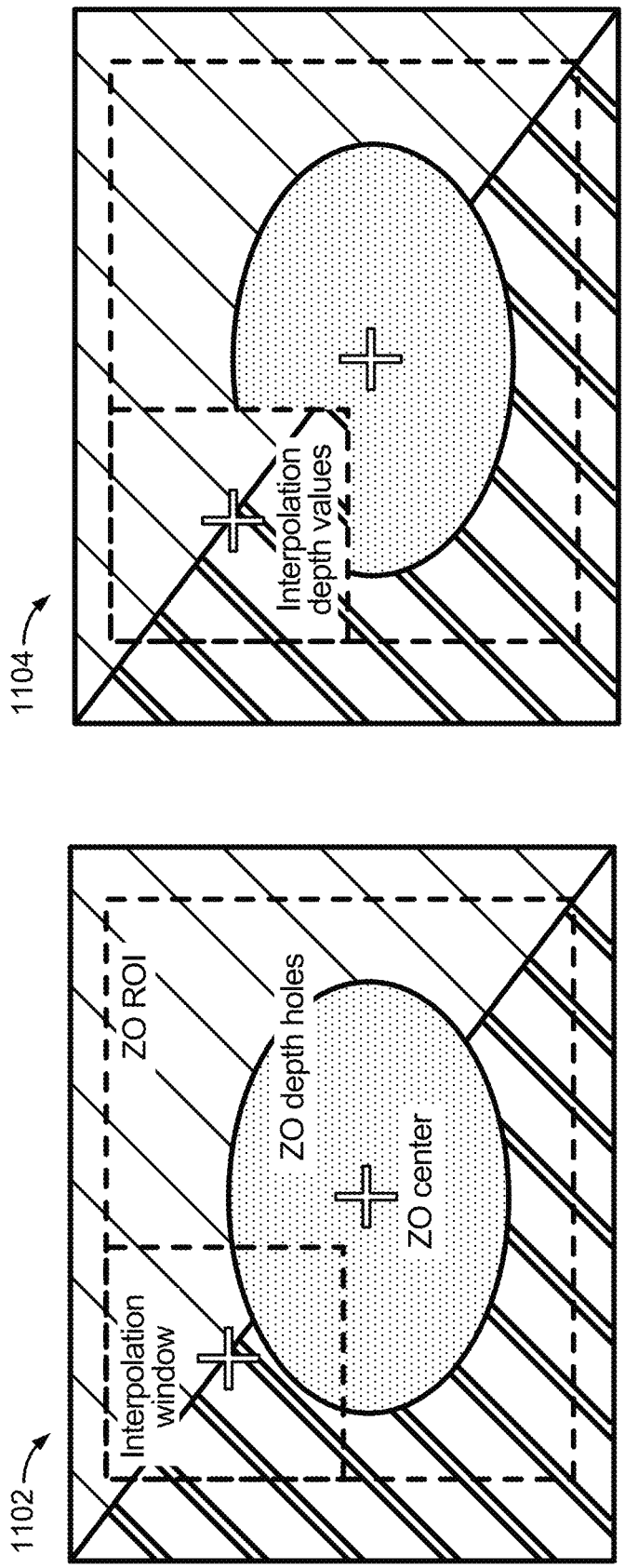
FIG. 11 is a conceptual diagram illustrating techniques for interpolating a spatial region within a coded pattern at a position of zero order light.

FIG. 11 is a conceptual diagram illustrating techniques for interpolating a spatial region within a coded pattern at a position of received zero order light. In this example, in response to determining the position of zero order light of image 1102, processing circuitry 12 may interpolate missing a spatial region within a coded pattern using surrounding depth points to generate corrected image 1104. For example, processing circuitry 12 may apply a median filter to average depth values.

Figure 12:
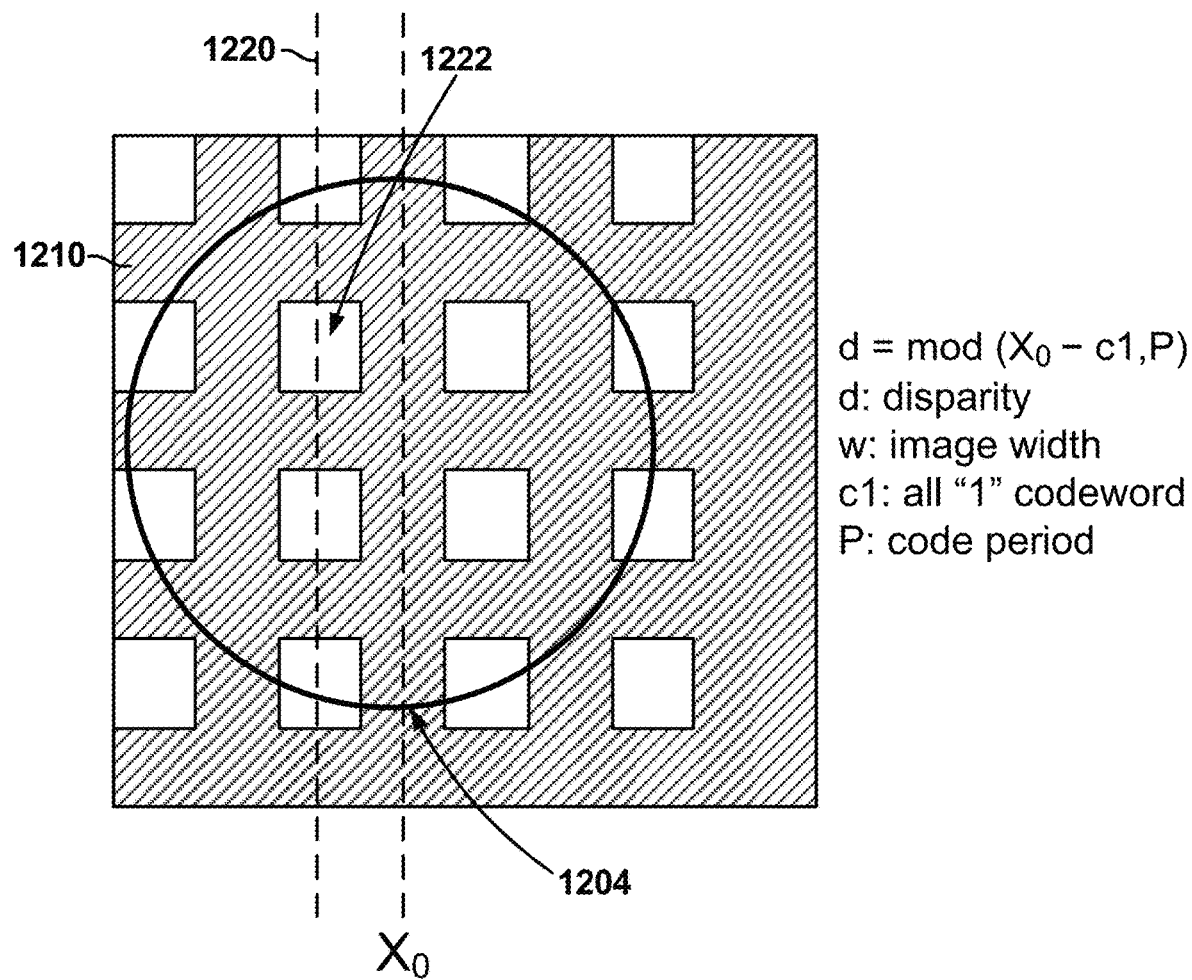
FIG. 12 is a conceptual diagram illustrating techniques for mapping a spatial region within a coded pattern of light at a position of zero order light.

FIG. 12 is a conceptual diagram illustrating techniques for mapping a spatial region within a coded pattern of light at a position of zero order light. In the example of FIG. 12, processing circuitry 12 has access to a coded pattern 1210, which was used by optical transmitter device 14 to transmit a coded pattern of light. In some examples, the spatial region may include a codeword (e.g., an all '1' codeword, a particular arbitrary codeword, etc.) of the coded pattern of light. As such, processing circuitry 12 may access the coded pattern 1210 to determine the spatial region associated with the position $X_0$, which may be known because of an a priori structure of the coded pattern 1210.

Due to a highly structured nature of the coded pattern, the position of the zero-order light may always be located in a spatial region of coded pattern 1210 corresponding to a particular code word, referred to herein as codeword 1 or simply "c1". Because of the a priori knowledge of c1 in the coded pattern 1210, processing circuitry 12 may omit reconstructing the zero order occlusion using surrounding regions (e.g., the mapping process of FIG. 11) and instead determine a spatial region of a coded pattern of light that corresponds to the position of the zero ordered light to generate missing depth information directly without interpolation filtering.

For example, a codeword associated with the position of zero order light may be set to an all '1' codeword in a predetermined pattern of codewords. Processing circuitry 12 may be configured to map the spatial region to the estimated position of the zero order light using the all '1' codeword. For instance, optical transmitter 16 may transmit the coded pattern with the all '1' codeword (e.g., c1) at the position of the zero order light and processing circuitry 12 may be configured to map the all '1' codeword at the estimated position of the zero order light in an image received with optical receiver 20. For example, processing circuitry 12 may map codewords associated with the position $X_0$ (e.g., the position of the zero order light in the received structed image) to the all '1' codeword in the predetermined pattern of codewords.

While the above example included an all '1' codeword (e.g., c1) at the position of the zero order light, in some examples, the codeword (e.g., c1) at the position of the zero order light may be an arbitrary codeword. In this example, processing circuitry 12 may be configured to map the spatial region to the estimated position of the zero order light using the arbitrary codeword. For instance, optical transmitter 16 may transmit the coded pattern with a particular arbitrary codeword (e.g., c1) at the position of the zero order light and processing circuitry 12 may map the particular arbitrary codeword to the position of the zero order light in an image received with optical receiver 20. As used herein, an arbitrary codeword may be based on a random choice. For example, an arbitrary codeword may be random, pseudo-random, or otherwise based on a random choice. In any case, processing circuitry 12 may determine codewords associated with the position of zero order light using the predetermined codeword to zero-order relationship, which may help to simplify region filling.

Mapping a spatial region to an estimated position of the zero order light may be computational simpler than using interpolating techniques (See FIG. 11) to estimate the codewords, which may help to reduce an energy consumption of device 10 compared to devices configured to use interpolation techniques. Moreover, mapping codewords to the predetermined pattern of codewords may be more accurate compared to codewords estimated using interpolating techniques, which may result in device 10 generating a more accurate depth map compared to devices configured to use interpolation techniques.

Processing circuitry 12 may determine a disparity between a transmitting location of a spatial region in the coded pattern and a receiving location of the spatial region in the corrected image. For example, processing circuitry 12 may generate a depth map based on the disparity. For instance, processing circuitry 12 may determine the disparity between the transmitting location of the spatial region and the receiving location 1220 of the spatial region 1222 based on a period for the spatial region. In some examples, processing circuitry 12 may calculate $$d = \mod\left(\frac{X_0}{2} - c1, P\right),$$

wherein d is the disparity between the transmitting location of the spatial region and the receiving location 1220 of the spatial region 1222, $X_0$ is the estimated position of the of zero order light in the image, c1 is the spatial region of the coded pattern that corresponds to the position of the zero order light in the coded pattern (e.g., an all '1' codeword), and P is a period for the spatial region. In this way, processing circuitry 12 may determine a spatial region that is obscured by zero order light without the need for additional processing using the surrounding region, which may help to reduce an energy consumption of device 10 compared to devices configured to use interpolation techniques.

Figure 13:
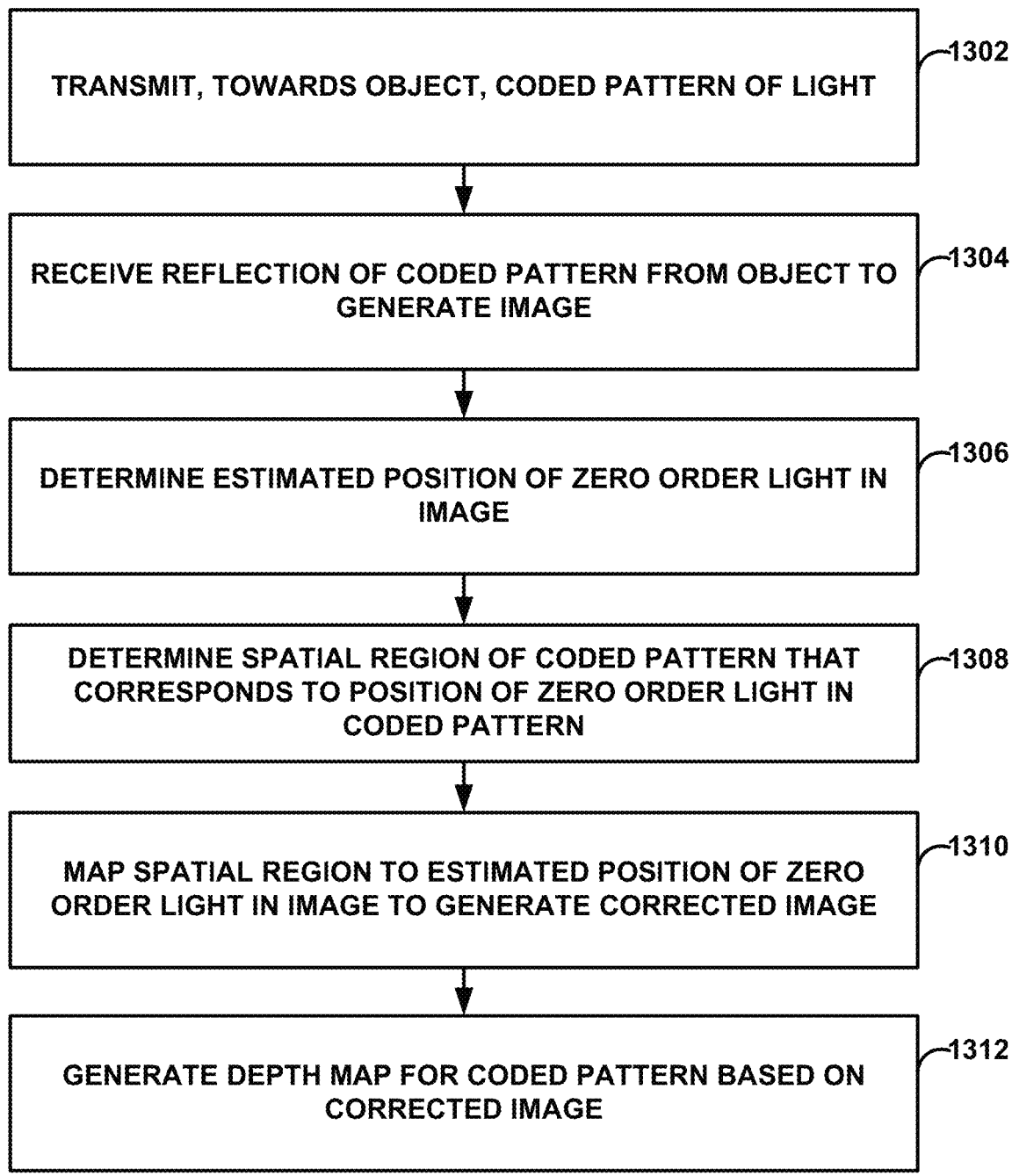
FIG. 13 is a flow chart of a method of image processing for performing one or more example techniques described in this disclosure.

FIG. 13 is a flow chart of a method of image processing for performing one or more example techniques described in this disclosure. FIG. 13 is discussed with reference to FIGS. 1-12 for example purposes only. Optical transmitter 16 transmits, towards an object, a coded pattern of light (1302). Optical receiver 20 receives a reflection of the coded pattern from the object to generate an image (1304). Processing circuitry 12 determines an estimated position of zero order light in the image (1306). Processing circuitry 12 determines a spatial region of the coded pattern that corresponds to a position of the zero order light in the coded pattern (1308). Processing circuitry 12 maps the spatial region to the estimated position of the zero order light in the image to generate a corrected image (1310). Processing circuitry 12 generates a depth map for the coded pattern based on the corrected image (1312).

In some examples, processing circuitry 12 may generate a digital representation of a scene based on the depth map. For example, processing circuitry 12 or other processing circuitry may generate, using the depth map, a 3D print cloud to a create 3D model. In some examples, processing circuitry 12 or other processing circuitry may apply, using the depth map, Bokeh and/or segmentation techniques to generate an image with out-of-focus portions and in-focus portions for display. In another example, processing circuitry 12 may generate, using the depth map, a 3D model that may be used to determine whether a 3D model corresponds to a known object (e.g. face).

While some examples herein output a scene as a single object, in some examples, processing circuitry 12 may generate the digital representation to include a plurality of objects. For example, processing circuitry 12 or other processing circuitry may generate, using the depth map, a first 3D print cloud for a first object to a create a first 3D model for the first object and generate, using the depth map, a second 3D print cloud for a second object to a create a second 3D model for the second object. In some examples, processing circuitry 12 or other processing circuitry may apply, using the depth map, Bokeh and/or segmentation techniques to generate a first image with out-of-focus portions for a first object (e.g., a background object) and a second image with in-focus portions for a second object (e.g., a foreground object). In another example, processing circuitry 12 may generate, using the depth map, a first 3D model for a first object (e.g., a nose) and a second object (e.g., lips) that may be used to determine whether a 3D model corresponds to a known object (e.g. face).

In some examples, processing circuitry 12 may output the digital representation to a display. For instance, processing circuitry 12 may output an image with out-of-focus portions to a display (e.g., display 58 of FIG. 14.). However, in some examples, processing circuitry 12 may output the digital representation to an internal application (e.g., for portrait mode, green screening, creating a model for manipulation and/or gaming, semantic understanding of a scene, etc.).

Figure 14:
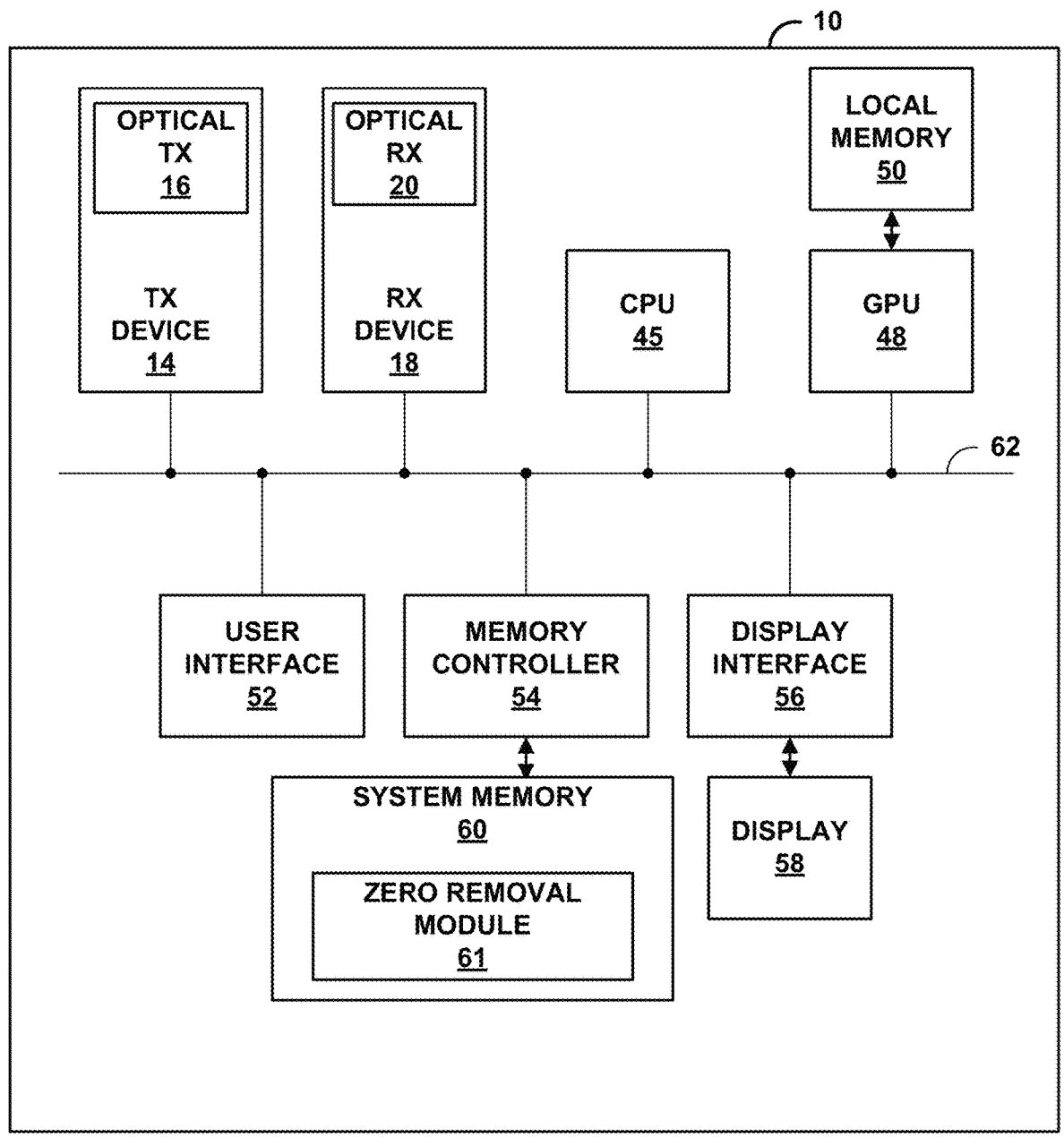
FIG. 14 is a block diagram illustrating a transmitter device and a receiver device of FIG. 1 in greater detail.

FIG. 14 is a block diagram illustrating transmitter device 14 and receiver device 18 of FIG. 1 in greater detail. FIG. 14 is a block diagram of a device for image processing configured to perform one or more example techniques described in this disclosure. FIG. 14 illustrates device 10 in more detail. As described above, examples of device 10 include a personal computer, a head-mounted display (e.g., augmented reality, virtual reality, etc.), a desktop computer, a laptop computer, a computer workstation, a video game platform or console, a wireless communication device (such as, e.g., a mobile telephone, a cellular telephone, a table computer, a satellite telephone, and/or a mobile telephone handset), a landline telephone, an Internet telephone, a handheld device such as a portable video game device or a personal digital assistant (PDA), a personal music player, a video player, a display device, a camera, a television, a television set-top box, a server, an intermediate network device, a mainframe computer or any other type of device that processes and/or displays graphical data.

As illustrated in the example of FIG. 14, device 10 includes transmitter device 14 that includes optical transmitter 16, receiver device 18 that includes optical receiver 20, a central processing circuit (CPU) 45, a graphical processing circuit (GPU) 48 and local memory 50 of GPU 48, user interface 52, memory controller 54 that provides access to system memory 60, and display interface 56 that outputs signals that cause graphical data to be displayed on display 58.

Transmitter device 14 and receiver device 18 are similar to those described above with respect to FIG. 1 and are not described further. However, in some examples, receiver device 18 may also function as a camera for device 10, and in such examples, receiver device 18 may be used for depth map generation and for capturing photographic images or device 10 may include a separate camera to capture photographic images. In this disclosure, receiver device 18 is described as being used for both generating the depth map and capturing photographic images. The processing circuit of receiver device 18 may function as a camera processor as well.

Also, although the various components are illustrated as separate components, in some examples the components may be combined to form a system on chip (SoC). As an example, the processing circuit of receiver device 18 may be formed with one or more of CPU 45, GPU 48, and display interface 56. In such examples, optical receiver 20 may be separate from receiver device 18. Furthermore, the examples described above with respect to the processing circuit of receiver device 18 generating the depth map are provided merely to ease understanding. In some examples, CPU 45, GPU 48, or some other device may be configured to perform the examples described above for the processing circuit of receiver device 18.

The various components illustrated in FIG. 14 may be formed in one or more microprocessors, application specific integrated circuits (ASICs), field programmable gate arrays (FPGAs), digital signal processors (DSPs), or other equivalent integrated or discrete logic circuitry. Also, transmitter device 14 and receiver device 18 may include local memory for storage of data such as coded patterns. Examples of such local memory include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 14 communicate with each other using bus 62. Bus 62 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 14 is merely example, and other configurations of computing devices and/or other image processing systems with the same or different components may be used to implement the techniques of this disclosure.

CPU 45 may comprise a general-purpose or a special-purpose processor that controls operation of device 10. A user may provide input to computing device 10 to cause CPU 45 to execute one or more software applications. The software applications that execute on CPU 45 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 52.

As one example, the user may execute an application that generates graphical data for stereoscopic images. The application may use images captured by optical receiver 20. In such examples, transmitter device 14 and receiver device 18 may together perform the example techniques described in this disclosure to generate a depth map. The application executing on CPU 45 may use the depth map and the captured images.

For instance, CPU 45 may transmit instructions and data to GPU 48 to render graphical images. In such examples, the application executing on CPU 45 may transmit instructions, the depth map, and other data to GPU 48 instructing GPU 48 to generate stereoscopic images. For example, GPU 48 includes a plurality of parallel pipelines which are a combination of fixed-function circuits and programmable circuits, and GPU 48 processes pixels through the parallel pipelines to generate the stereoscopic images.

Memory controller 54 facilitates the transfer of data going into and out of system memory 60. For example, memory controller 54 may receive memory read and write commands, and service such commands with respect to system memory 60 in order to provide memory services for the components in computing device 10. Memory controller 54 is communicatively coupled to system memory 60. Although memory controller 54 is illustrated in the example computing device 10 of FIG. 14 as being a processing module that is separate from both CPU 45 and system memory 60, in other examples, some or all of the functionality of memory controller 54 may be implemented on one or both of CPU 45 and system memory 60.

System memory 60 may store program modules and/or instructions and/or data that are accessible by transmitter device 14, receiver device 18, CPU 45, and GPU 48. For example, system memory 60 may store user applications and graphics data associated with the applications. System memory 60 may additionally store information for use by and/or generated by other components of computing device 10. For example, system memory 60 may act as a device memory for transmitter device 14 and receiver device 18 (e.g., device memory for the camera processor of receiver device 18). System memory 60 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 60 may include instructions that cause transmitter device 14, receiver device 18, CPU 45, GPU 48, and display interface 56 to perform the functions ascribed in this disclosure to transmitter device 14, receiver device 18, CPU 45, GPU 48, and display interface 56. For example, system memory 60 may include zero removal module 61 configured to cause device 10 to determine a position of zero order light and to map a spatial region at the position of the zero order. Accordingly, system memory 60 may be a computer-readable storage medium having instructions stored thereon that, when executed, cause one or more processors (e.g., processing circuits of transmitter device 14 and/or receiver device 18 and CPU 45, GPU 48, and display interface 56) to perform various functions.

In some examples, system memory 60 is a non-transitory storage medium. The term "non-transitory" indicates that the storage medium is not embodied in a carrier wave or a propagated signal. However, the term "non-transitory" should not be interpreted to mean that system memory 60 is non-movable or that its contents are static. As one example, system memory 60 may be removed from device 10, and moved to another device. As another example, memory, similar to system memory 60, may be inserted into device 10. In certain examples, a non-transitory storage medium may store data that can, over time, change (e.g., in RAM).

Receiver device 18, CPU 45, and GPU 48 may store depth maps, image data, rendered image data, and the like in respective buffers that is allocated within system memory 60. Display interface 56 may retrieve the data from system memory 60 and configure display 58 to display the image represented by the rendered image data. In some examples, display interface 56 may include a digital-to-analog converter (DAC) that is configured to convert the digital values retrieved from system memory 60 into an analog signal consumable by display 58. In other examples, display interface 56 may pass the digital values directly to display 58 for processing.

Display 58 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 58 may be integrated within computing device 10. For instance, display 58 may be a screen of a mobile telephone handset or a tablet computer. Alternatively, display 58 may be a stand-alone device coupled to computing device 10 via a wired or wireless communications link. For instance, display 58 may be a computer monitor or flat panel display connected to a personal computer via a cable or wireless link.

Figure 16:
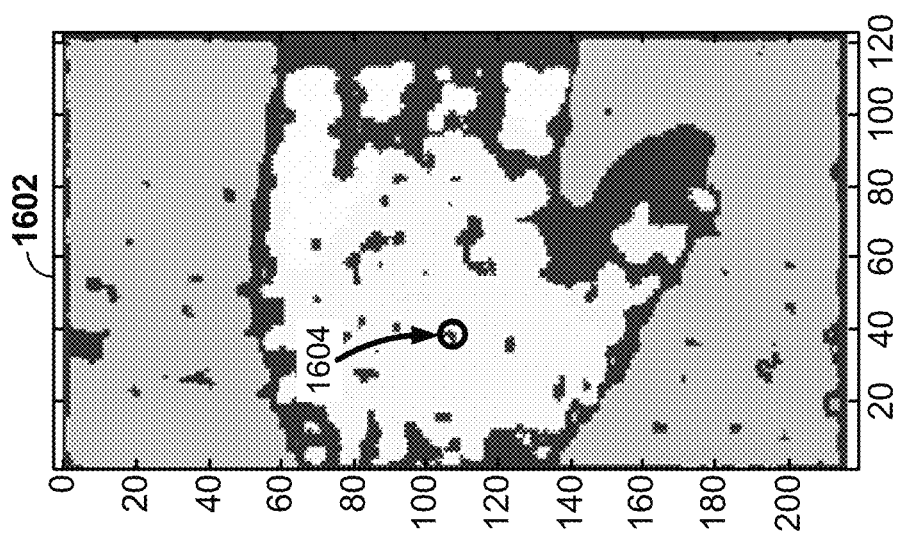
FIG. 16 is a conceptual diagram illustrating a depth map generated using the image with zero order light of FIG. 15.
Figure 15:
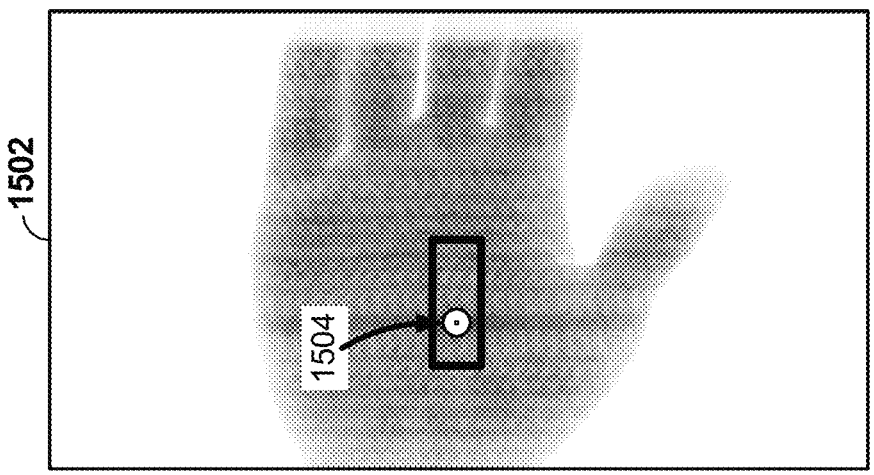
FIG. 15 is a conceptual diagram illustrating a received image with zero order light.

FIG. 15 is a conceptual diagram illustrating a received image with zero order light. In the example of FIG. 15, image includes zero order light 1504. FIG. 16 is a conceptual diagram illustrating a depth map generated using the image with zero order light of FIG. 15. In this example, processing circuitry 12 generates depth map 1602 to include hole 1604.

Figure 17:
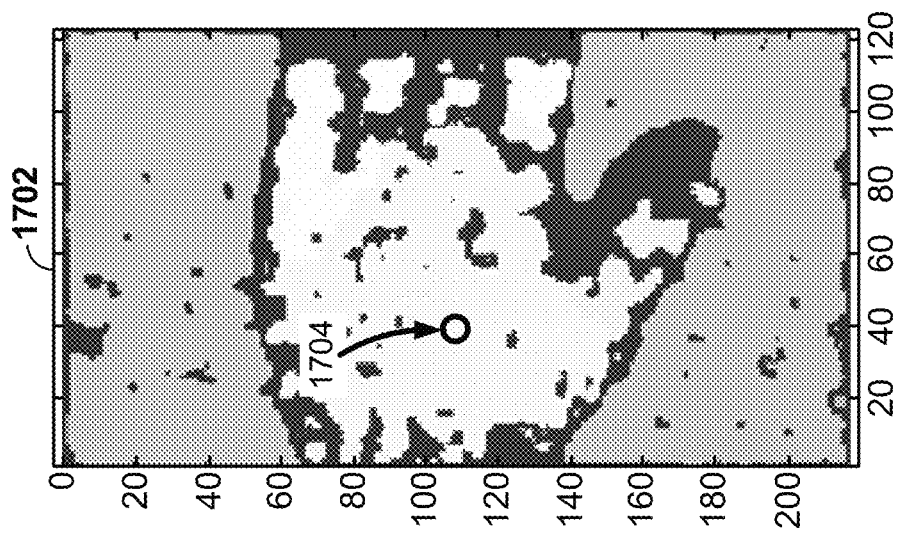
FIG. 17 is a conceptual diagram illustrating a depth map generated using the image with zero order light of FIG. 15 with spatial regions mapped at a position of the zero order light.

FIG. 17 is a conceptual diagram illustrating a depth map generated using the image with zero order light of FIG. 15 with spatial regions mapped at a position of the zero order light. In the example of FIG. 17, processing circuitry 12 may perform one or more steps of FIG. 13 to generate a corrected image that removes the zero order light. In this example, processing circuitry 12 generates depth map 1702. As shown, region 1704, which corresponds to hole 1604 in depth map 1602 of FIG. 16 does not includes a hole.

Again, holes may cause processing circuitry 12 or other processing circuitry to obscure key features (e.g., nodal features), such as noses, lips, or eyes, which may be undesirable in applications such as, but not limited to, for example, facial recognition, 3D printing, Bokeh and/or segmentation techniques, face liveness detection techniques, or other applications.

For example, holes may obscure portions of a coded pattern of light, which may reduce a performance of facial recognition. Such a reduction in facial recognition performance may result in facial recognition failing to accurately recognize a user, thereby causing user frustration. In some examples, the reduction in facial recognition performance may cause facial recognition to incorrectly recognize objects as the user, thereby reducing a confidence threshold of the system designer. Reducing the confidence threshold of the system designer may prevent facial recognition from high security applications, such as, for example, but not limited to, mobile payments.

In another example, holes may obscure portions of a coded pattern of light, which may reduce a performance of 3D printing. For instance, the reduction in 3D printing performance may result in a 3D printing system using a 3D print cloud that includes incorrect depth information, thereby resulting in a 3D printing system failing to accurately print. In another example, holes may obscure portions of a coded pattern of light, which may reduce a performance of Bokeh and/or segmentation techniques. For instance, the reduction in Bokeh and/or segmentation techniques performance may result in processed images having foreground features blurred instead of only background features, resulting in user frustration. As such, depth map 1702 may be more suitable for applications, such as, but not limited to facial recognition, compared to depth map 1602.

In one or more examples, the functions described may be implemented in hardware, software, firmware, or any combination thereof. If implemented in software, the functions may be stored on, as one or more instructions or code, a computer-readable medium and executed by a hardware-based processing circuit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of image processing, the method comprising:
    transmitting, with an optical transmitter, towards an object, a coded pattern of light;
    receiving, with an optical receiver, a reflection of the coded pattern from the object to generate an image;
    determining, with processing circuitry, an estimated position of zero order light in the image;
    determining, with the processing circuitry, a spatial region of the coded pattern that corresponds to a position of the zero order light in the coded pattern;
    mapping, with the processing circuitry, the spatial region to the estimated position of the zero order light in the image to generate a corrected image; and
    generating, with the processing circuitry, a depth map for the coded pattern based on the corrected image.

2. The method of claim 1, wherein generating the depth map comprises:
    determining, with the processing circuitry, a disparity between a transmitting location of the spatial region in the coded pattern and a receiving location of the spatial region in the corrected image; and
    generating, with the processing circuitry, the depth map based on the disparity.

3. The method of claim 2, wherein determining the disparity between the transmitting location of the spatial region and the receiving location of the spatial region comprises:
    calculating $$d = \mathrm{mod}\left(\frac{X_0}{2} - c1, P\right),$$

wherein d is the disparity between the transmitting location of the spatial region and the receiving location of the spatial region, $X_0$ is the estimated position of the of zero order light in the image, c1 is the spatial region of the coded pattern that corresponds to the position of the zero order light in the coded pattern, and P is a period for the spatial region.

4. The method of claim 1, further comprising:
    generating, with the processing circuitry, a digital representation of a scene based on the depth map; and
    outputting, with the processing circuitry, the digital representation of the scene to a display.

5. The method of claim 1, wherein the zero order light obscures the spatial region at the position of the zero order light in the image.

6. The method of claim 1, wherein the zero order light indicates undiffracted light output by the optical transmitter when transmitting the coded pattern.

7. The method of claim 1, wherein determining the estimated position of the zero order light comprises:
    determining a probable location window for the zero order light in the image based on at least one of a minimum estimated distance between the optical transmitter and an object reflecting the coded pattern, a maximum estimated distance between the optical transmitter and the object reflecting the coded pattern, or a focal length of the optical receiver.

8. The method of claim 7, wherein determining the probable location window comprises:
    calculating an inner horizontal edge of the probable location window using the minimum estimated distance between the optical transmitter and the object reflecting the coded pattern; and
    calculating an outer horizontal edge of the probable location window using the maximum estimated distance between the optical transmitter and the object reflecting the coded pattern.

9. The method of claim 7, wherein determining the estimated position of the zero order light further comprises:
    filtering the probable location window in the image using at least one of a plurality of filters, each filter of the plurality of filters corresponding to a respective target size of the zero order light in the coded pattern.

10. The method of claim 9, wherein filtering the probable location window comprises applying multiscale blob detection.

11. The method of claim 9, wherein filtering the coded pattern comprises:
    selecting a filter of the plurality of filters based on a difference of Gaussian for the plurality of filters; and
    filtering the coded pattern with the selected filter.

12. The method of claim 1, wherein the spatial region includes an all '1' codeword and wherein mapping the spatial region comprises mapping the spatial region using the all '1' codeword.

13. The method of claim 1, wherein the spatial region includes an arbitrary codeword and wherein mapping the spatial region comprises mapping the spatial region using the arbitrary codeword.

14. A device for image processing, the device comprising:
an optical receiver configured to receive a reflection of a structured light from an object to generate an image, the coded pattern; and
processing circuitry configured to:
   determine an estimated position of zero order light in the image;
   determine a spatial region of the coded pattern that corresponds to a position of the zero order light in the coded pattern;
   map the spatial region to the estimated position of the zero order light in the image to generate a corrected image; and
   generate a depth map for the coded pattern based on the corrected image.

15. The device of claim 14, wherein, to generate the depth map, the processing circuitry is configured to:
determine a disparity between a transmitting location of the spatial region in the coded pattern and a receiving location of the spatial region in the corrected image; and
generate the depth map based on the disparity.

16. The device of claim 15, wherein, to determine the disparity between the transmitting location of the spatial region and the receiving location of the spatial region, the processing circuitry is configured to:
calculate $$d = \mathrm{mod}\!\left(\frac{X_0}{2} - c1, P\right),$$

wherein d is the disparity between the transmitting location of the spatial region and the receiving location of the spatial region, X0 is the estimated position of the of zero order light in the image, c1 is the spatial region of the coded pattern that corresponds to the position of the zero order light in the coded pattern, and P is a period for the spatial region.

17. The device of claim 14, wherein the processing circuitry is further configured to:
generate a digital representation of a scene based on the depth map; and
output the digital representation of the scene to a display.

18. The device of claim 14, wherein the zero order light obscures the spatial region at the position of the zero order light in the image.

19. The device of claim 14, wherein the zero order light indicates undiffracted light output by the optical transmitter when transmitting the coded pattern.

20. The device of claim 14, wherein, to determine the estimated position of the zero order light, the processing circuitry is configured to:
determine a probable location window for the zero order light in the image based on at least one of a minimum estimated distance between the optical transmitter and an object reflecting the coded pattern, a maximum estimated distance between the optical transmitter and the object reflecting the coded pattern, or a focal length of the optical receiver.

21. The device of claim 20, wherein, to determine the probable location window, the processing circuitry is configured to:
calculate an inner horizontal edge of the probable location window using the minimum estimated distance between the optical transmitter and the object reflecting the coded pattern; and
calculate an outer horizontal edge of the probable location window using the maximum estimated distance between the optical transmitter and the object reflecting the coded pattern.

22. The device of claim 20, wherein, to determine the estimated position of the zero order light, the processing circuitry is configured to:
filter the probable location window in the image using at least one of a plurality of filters, each filter of the plurality of filters corresponding to a respective target size of the zero order light in the coded pattern.

23. The device of claim 22, wherein, to filter the probable location window, the processing circuitry is configured to apply multiscale blob detection.

24. The device of claim 22, wherein, to filter the probable location window, the processing circuitry is configured to:
select a filter of the plurality of filters based on a difference of Gaussian for the plurality of filters; and
filter the coded pattern with the selected filter.

25. The device of claim 14, wherein the processing circuitry comprises first processing circuitry, the device further comprising second processing circuitry configured to:
receive the generated depth map from the first processing circuit; and
generate graphical data for the one or more images based on the generated depth map.

26. The device of claim 25, wherein the first processing circuitry and the second processing circuitry are the same processing circuit.

27. The device of claim 14, wherein the device comprises one of:
a wireless communication device, a laptop, a desktop, a tablet, a camera, and a video gaming console.

28. The device of claim 14, comprising:
an optical transmitter configured to transmit, towards the object, the coded pattern.

29. A computer-readable storage medium including instructions stored thereon that when executed cause one or more processors of a device for image processing to:
cause an optical transmitter to transmit, towards an object, a coded pattern of light;
cause an optical receiver to receive a reflection of the coded pattern from the object to generate an image; and
cause processing circuitry to:
   determine an estimated position of zero order light in the image;
   determine a spatial region of the coded pattern that corresponds to a position of the zero order light in the coded pattern;
   map the spatial region to the estimated position of the zero order light in the image to generate a corrected image; and
   generate a depth map for the coded pattern based on the corrected image.

30. A device for image processing, the device comprising:
means for transmitting, towards an object, a coded pattern of light;
means for receiving a reflection of the coded pattern from the object to generate an image;
means for determining an estimated position of zero order light in the image;
means for determining a spatial region of the coded pattern that corresponds to a position of the zero order light in the coded pattern;
means for mapping the spatial region to the estimated position of the zero order light in the image to generate a corrected image; and
means for generating a depth map for the coded pattern based on the corrected image.

* * * * *